United States Patent [19]
Osman et al.

[11] Patent Number: 5,638,512
[45] Date of Patent: *Jun. 10, 1997

[54] RING NETWORK SECURITY SYSTEM WITH ENCODING OF DATA ENTERING A SUBNETWORK AND DECODING OF DATA LEAVING THE SUBNET WORK

[75] Inventors: Fazil Osman, Escondido; Ronald Perloff, Poway, both of Calif.

[73] Assignee: XLNT Designs, Inc., San Diego, Calif.

[*] Notice: The term of this patent shall not extend beyond the expiration date of Pat. No. 5,495,580.

[21] Appl. No.: 424,299

[22] PCT Filed: Oct. 19, 1993

[86] PCT No.: PCT/US93/09995

§ 371 Date: Apr. 19, 1995

§ 102(e) Date: Apr. 19, 1995

[87] PCT Pub. No.: WO94/09579

PCT Pub. Date: Apr. 28, 1994

Related U.S. Application Data

[63] Continuation-in-part of Ser. No. 963,726, Oct. 20, 1992, Pat. No. 5,495,580.

[51] Int. Cl.⁶ .............................. H04J 3/02; H04L 12/42; H04L 12/46
[52] U.S. Cl. ............................... 395/187.01; 395/200.21
[58] Field of Search .......................... 395/186, 187.01, 395/200.01, 200.21; 380/48, 49

[56] References Cited

U.S. PATENT DOCUMENTS

| | | | |
|---|---|---|---|
| 4,160,120 | 7/1979 | Barnes et al. | 178/22 |
| 4,341,925 | 7/1982 | Doland | 178/22.17 |
| 4,386,416 | 5/1983 | Gilner et al. | 395/375 |
| 5,161,192 | 11/1992 | Carter et al. | 380/48 |
| 5,177,788 | 1/1993 | Schanning et al. | 380/23 |
| 5,235,644 | 8/1993 | Gupta et al. | 370/23 |
| 5,251,203 | 10/1993 | Thompson | 370/13.1 |
| 5,329,623 | 7/1994 | Smith et al. | 395/187.01 |
| 5,371,852 | 12/1994 | Attanasio et al. | 395/200.02 |
| 5,495,580 | 2/1996 | Osman | 395/187.01 |

OTHER PUBLICATIONS

Ruth Nelson "End-to-End Encryption at the network layer", Computer Sercurity Apllication Conference, 1989, p.28.

*Primary Examiner*—Thomas C. Lee
*Assistant Examiner*—D. Dinh
*Attorney, Agent, or Firm*—Fish & Richardson P.C.

[57] ABSTRACT

A system for securing communications between devices connected to a ring network. In accordance with the present invention, when a message frame is passed around the ring network, a gate keeper circuit associated with at least one port of a hub determines whether the message frame is intended for any of the nodes connected to that port. If the message frame is not intended for any of the nodes connected to that port, the message frame is encoded before it exits the hub through the port to traverse the subnetwork connected to the port, and decoded after it reenters the hub through the port. If and only if at least one node on the subnetwork connected to the port is intended to receive the message frame, then each node connected to that port can read the message frame.

25 Claims, 11 Drawing Sheets

RING NETWORK SECURITY SYSTEM WITH ENCODING OF DATA ENTERING A SUBNETWORK AND DECODING OF DATA LEAVING THE SUBNET WORK

BACKGROUND OF THE INVENTION

1. Related Application

This application is a continuation-in-part of U.S. patent application Ser. No. 07/963,726, filed on Oct. 20, 1992, now U.S. Pat. No. 5,495,580.

2. Field of the Invention

This invention relates to computer communication networks, and more particularly to a system for providing secure communications between devices connected to a ring network.

3. Description of Related Art

As computers become increasingly relied upon to perform diverse functions, the necessity to share information and resources between computers is also increasing. Computer networks are a common means for accomplishing the necessary interconnection between computers which allow such sharing to take place. Computer networks allow one computer or terminal (a "node") to pass information to another computer or terminal ("node") for the purpose of performing operations for which the receiving node is more appropriate. Additionally, information may be passed from local nodes to central processing and storage centers. An example of such a network is the automatic teller machines (ATMs) installed at many banks today.

One of the biggest concerns of managers of such networks, after network operational availability ("uptime"), is ensuring the security of the network, i.e., protecting the network from intentional penetration by unauthorized users. There are many ways to provide security for networks. The effectiveness of most of these security means depends upon the configuration of the particular network to be secured. One known means for securing a network is to provide end-to-end encryption. Such end-to-end encryption requires each message that is transmitted from one node on the network to another node on the network to be encrypted such that only authorized nodes can send and receive messages. The receiving node, upon receipt of an encrypted message, must decode the message based upon the encoding method used. However, use of such an end-to-end encryption scheme is costly, difficult to manage, and slow. A preferred method is to have the network provide the security means.

Networks often comprise multiple subnetworks having bridges and routers interconnecting them. Security can be added to the bridges and routers such that they do not allow unauthorized traffic onto a network. However, this does not prevent a node from receiving messages that are not intended for that node. The problem of preventing unauthorized nodes from receiving messages intended only for authorized nodes is a substantial one, since "snooping" using an unauthorized node could reveal very sensitive information, including user passwords and file contents being transferred across the network. For example, a disgruntled employee who legitimately has access to the network may gain much greater access than necessary. This could unnecessarily jeopardize highly sensitive information. This problem is exacerbated by the ease with which network analyzers and other low-cost network monitoring devices can be obtained and connected to networks having hubs with ports which interconnect subnetworks of nodes within the network. Connection of such network monitoring devices permits an intruder to monitor the traffic on the network and decode the higher layer protocols (usually available from the analyzer). This would allow an intruder, for example, to do such things as monitor specific conversations between users and hosts as users log-on, revealing to the intruder the users' passwords and other information necessary to log-on to hosts.

An approach to the security problem which is less cumbersome than end-to-end encryption is implemented in bussed network configurations, such as Ethernet.

FIG. 1 illustrates the configuration of a typical bussed network. All incoming data from any port 101 of the hub 100 that is transmitting is put onto the hub bus 102 in the form of frames, and then broadcast out to all the ports 101 on port busses 105. To provide security, a "thrasher" circuit 103 is inserted between the hub's bus 102 and each port 101. The hub 100 determines the address(es) of the nodes 104 on a particular port 101a. When a frame is to be transmitted out onto that port 101a, the thrasher circuit 103a coupled to that port compares the destination of the frame with the nodes 104 connected to that port 101a. If the port 101a is connected to a node or nodes 104 which are intended to receive the frame (e.g., the frame is addressed to one or more nodes, the frame is a multicast intended for all nodes 104, or the frame is a management frame) the frame is transmitted; otherwise the thrasher circuit 103 "thrashes" the frame (i.e., makes it unintelligible before the frame transmission is completed through port 1a). Hence, the thrasher circuit 103a ensures that nodes connected to the part 101a can only read frames that are authorized for the nodes of that port 101a.

While this solution provides added security in bussed networks, it is not possible to implement the thrasher circuit described above in ring networks or other shared media access networks in which a node inspects and possibly modifies information before it is transmitted to a next node sharing the media, hereinafter called a ring. FIG. 2 is an illustration of a prior art ring network. In ring networks, all nodes 204 are daisy-chained such that a message frame must go through each node 204 in a sequential manner. Nodes 204 may be either end nodes or hubs. A hub which is coupled to a master port of another hub can be used to generate a "tree" of nodes 204. If a frame is thrashed by a thrasher circuit associated with a port 201 of a hub 200, it will be thrashed for all other nodes 204 associated with other ports 201 that are connected to the network further downstream.

Thus, there remains a need for a security system that is compatible with ring networks and which does not rely upon end-to-end encryption of the message. The present invention provides a fast, inexpensive, and easily implemented security system that fills this need.

SUMMARY OF THE INVENTION

The present invention is a security system for ring networks that provides security at the hub level, thus providing the network manager with a means to secure the network which is inaccessible to the user. The inventive system is used in ring networks comprising hubs having one or more ports to which one or more nodes are serially connected in a daisy-chain fashion, forming a "subnetwork". The inventive system comprises a gatekeeper circuit associated with each master port of each network hub.

In the illustrated embodiment, information in a ring network is formatted as a frame having a header field containing the address of the destination node and the source node, a data section containing the particular information being transmitted, and a trailer section preferably containing an error detection code, such as a cyclical redundancy checking (CRC) code. Such frames are passed in one direction from one node to another along the ring. When information is taken into a hub, it is transmitted to a first port. The first port then passes the frame to the first node connected to that port. Assuming that only one node is connected to the first port, the node transmits the frame back to the port to be passed to the next port within the hub. This process continues until the frame has gone through each node in each subnetwork of the hub. When more than one hub is connected to the ring network, the frame is transmitted to the next hub on the ring. The above process is repeated for each hub in the ring. In the preferred embodiment of the present invention, more than one message frame may be circulating through the network at any one time.

In accordance with the present invention, each master port is coupled to a gate keeper circuit that includes an address detector circuit, a scrambler circuit, a descrambler circuit, a pseudo-random binary sequence (PRBS) generator, and preferably an error detection code (EDC) circuit. The gate keeper circuit determines whether the frame is intended for any node in the subnetwork connected to the associated port.

If the frame is not intended for any of the nodes of the subnetwork connected to the associated port, the scrambler circuit encodes the data field of the frame. The encoding may be very simple, such as "Exclusive-ORing" (XOR'ing) the data section of the frame with a randomly generated word, or a more sophisticated method, such as the Data Encryption Standard (DES) algorithm. The error detection code, if present, is recalculated for the frame and only the data sections are encoded. If the error detection code is present and indicated an error prior to encoding, the error detection code is recalculated to indicate an error, thereby preserving the indication. Since other information, such as frame length, frame count, status indications, etc., carried in the frame is not encoded, such information remains correct, allowing network management programs to be unaffected. The frame is passed from one node of a subnetwork to the next node, until the frame is returned to the transmitting port. The same criteria that is used by the gate keeper to determine whether a particular frame should be encoded is used to determine whether that frame should be decoded. Once it is determined that the frame should be decoded, the frame is decoded, and the error detection code is recalculated as in the encoding process.

The frame continues down the ring, being tested by the gate keeper circuit at each port to determine whether the frame is to be encoded by that port's scrambler circuit or not. Thus, the frame can only be read by the nodes connected to those particular ports to which at least one attached node is intended to receive the message. Devices connected to one port cannot read messages intended for nodes connected to other pens. In the present invention, the same key that is associated with the frame at the time the frame is encoded is required at the time the frame is to be decoded. In the preferred embodiment, frequent changes are made in the key, thus further enhancing the security of the system.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Figure 1:
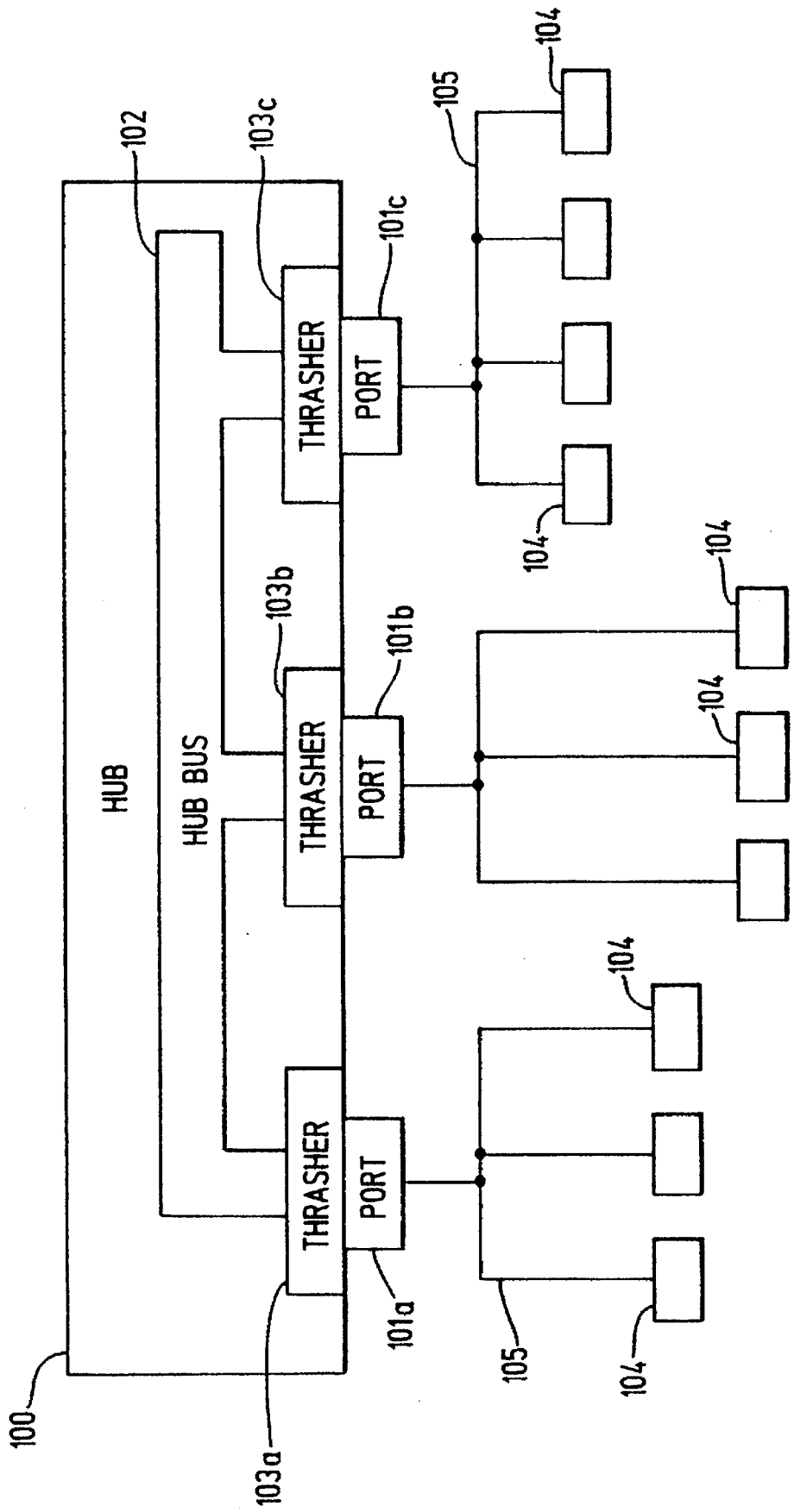
FIG. 1 is an illustration of a prior art bussed network.
Figure 2:
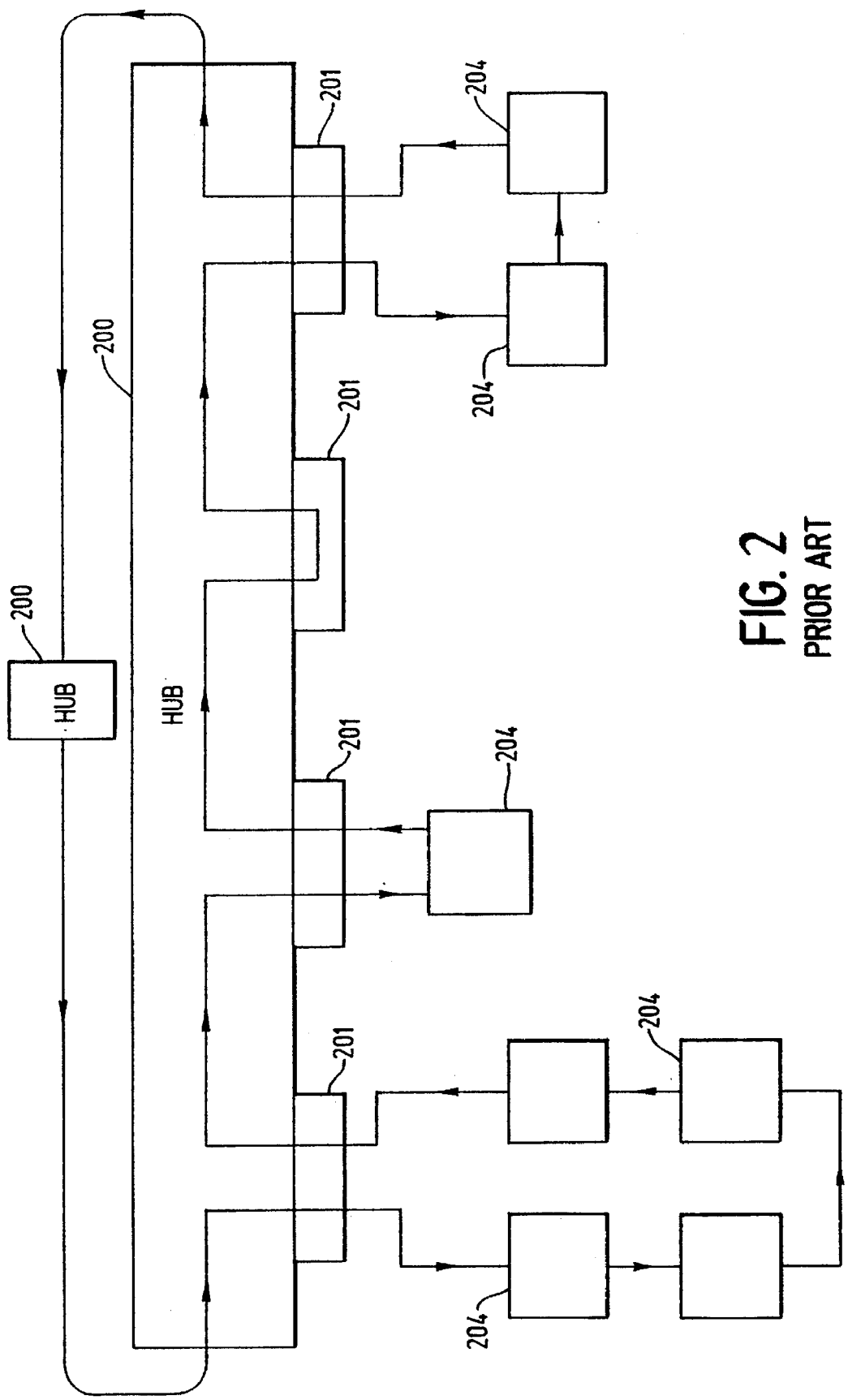
FIG. 2 is an illustration of a prior art ring network.
Figure 3:
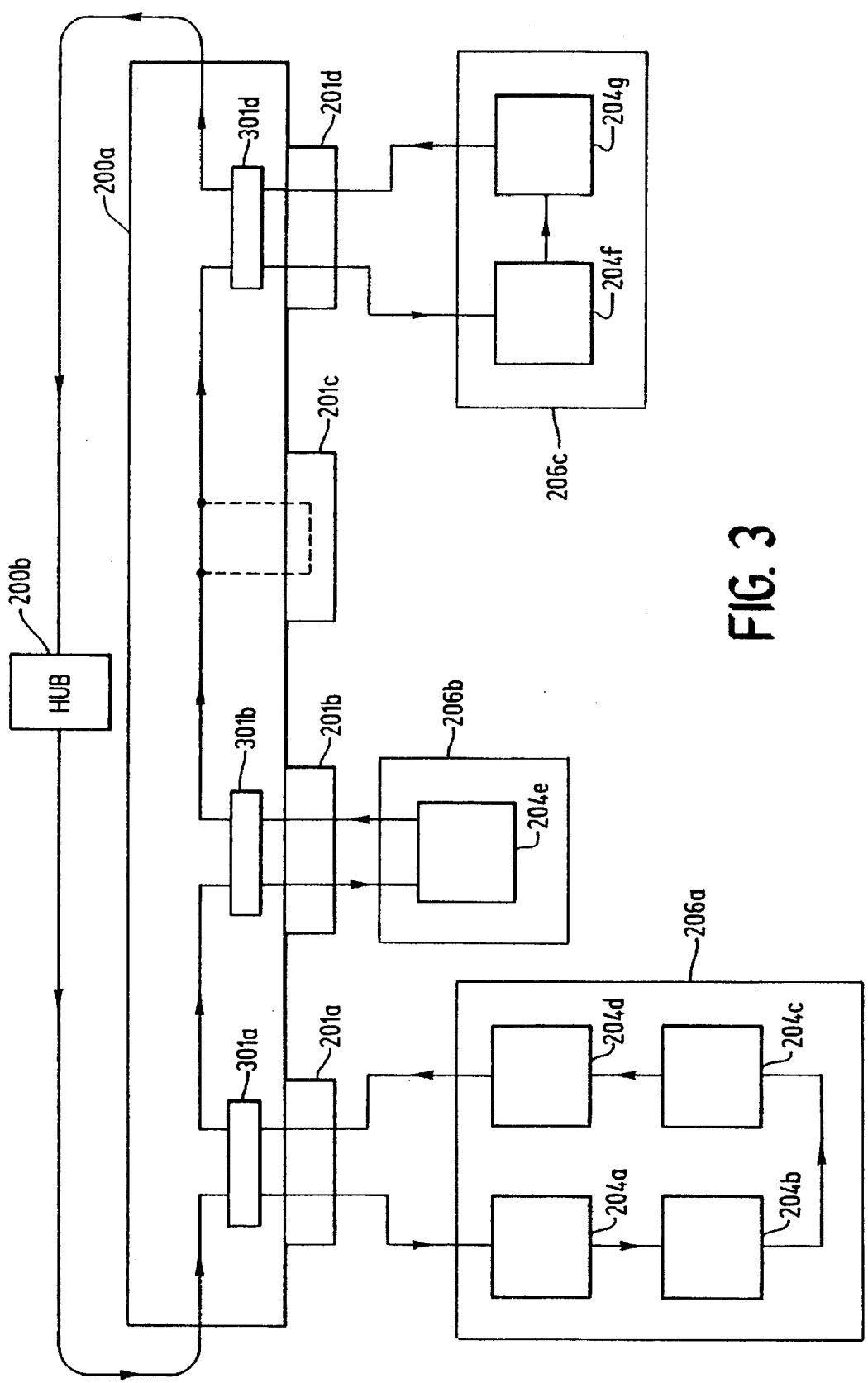
FIG. 3 is an illustration of the present invention as implemented in a ring network including hubs.

Throughout this description, the preferred embodiment and examples shown should be considered as exemplars, rather than as limitations on the present invention.
Overview The present invention is a security system that is compatible with ring networks. Ring networks (sometimes referred to as "loop" networks) are well known in the art of computer interfacing and networking, as indicated in Distributed Micro/Minicomputer Systems (Structures, Implementation, and Application), Weitzman (Prentice-Hall, Inc. 1980, section 2.4). FIG. 3 is an illustration of the present invention as implemented in a ring network having a multiplicity of elements (such as nodes 204, hubs 200, and ports 201 within hubs 200) connected thereto. While the illustrated embodiment includes hubs 200 having ports 201 to which subnetworks 206 of nodes 204 are connected, it should be understood that the present invention can be used with any ring network configuration. Typically in ring networks, data flows around the ring network in only one direction. However, the invention is not limited only to ring networks in which data flows in one direction. In the present description, elements which receive data from a transmitting element are referred to as "downstream" from the transmitting element. Active subnetworks are considered to be those subnetworks which include at least one node.

In accordance with the present invention, when a message is passed around the ring network, a gate keeper circuit 301 associated with each port 201 of a hub 200 determines whether the message frame is intended for, or sourced by, any of the nodes 204 connected to that port 201. If the message frame is not intended for, or sourced by any of the nodes 204 connected to that port 201, the message frame is encoded before it exits the hub 200 through the port 201 to traverse the subnetwork 206 connected to the port 201, and decoded after it reenters the hub 200 through the port 201. In the preferred embodiment of the present invention, the type of frame is also considered when determining whether a frame is to be encoded. Thus, if and only if at least one node 204 on the subnetwork 206 connected to the port 201 is intended to receive the message frame, then each node 204 connected to that port 201 can read the message frame.

Details of the Invention

In the present invention, a gate keeper circuit 301 is coupled between the circuitry of the hub 200 and each port 201. Referring to the ring network shown in FIG. 3, adjacent nodes 204 may be connected to the ports 201 of the hubs 200. A node 204 may be any device that is capable of either sending data to, or receiving data from the network. The number of nodes 204 which may be connected to a particular port 201 depends upon the characteristics of the particular hub 200 and the network. Each node 204 has an address on the network. Hubs convert a logical ring into a physical star for cabling convenience and thus provide an efficient means to expand a network and to manage very complex network structures more easily.

Messages circulate around the network in the form of a message frame. A message frame has a header section containing at least the address of the destination node to which the message frame is being sent, and optionally containing the address of the source node from which the message frame originated. More elaborate headers may also be used. Following the header is a data section, or field, containing the contents of the message frame. After the data section is a trailer section, preferably containing an error detection code (EDC), such as a cyclical redundancy checking (CRC) code. The trailer may also include an end symbol which indicates the end of the message frame. Additional information concerning the nature or status of the frame or the message within the frame may also be provided within the trailer.

Figure 4:
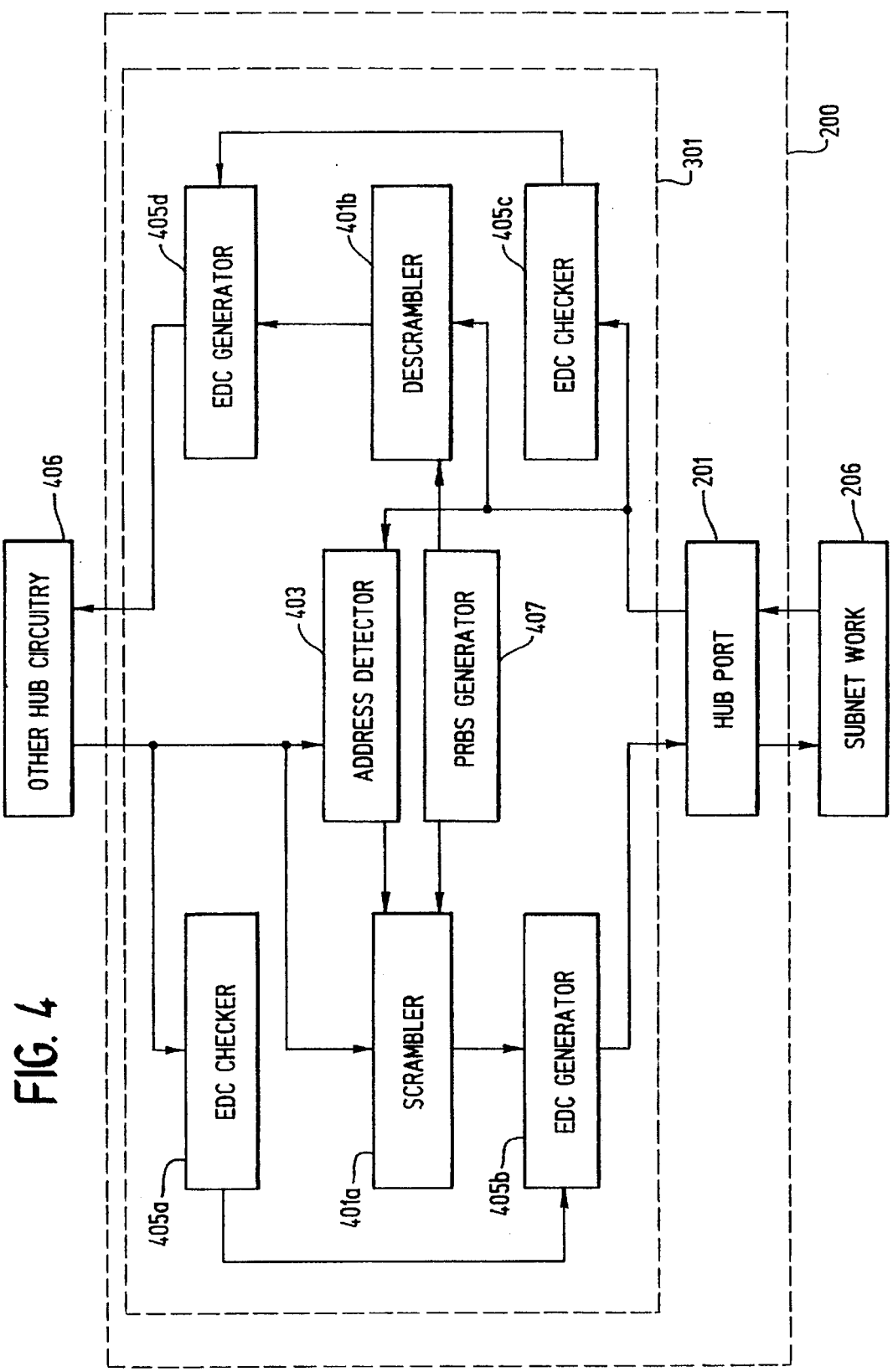
FIG. 4 is a block diagram of a gate keeper circuit in accordance with the present invention.

FIG. 4 is a block diagram of one embodiment of a gate keeper circuit 301 in accordance with the present invention. The gate keeper circuit 301 includes a scrambler circuit 401a, a descrambler circuit 401b, an address detector circuit 403. EDC checker circuits 405a, 405c, EDC generator circuits 405b, 405d, and a pseudo-random binary sequence (PRBS) generator 407. Alternative embodiments of the present invention may not contain EDC checker circuits and EDC generator circuits. The address detector circuit 403 is coupled to, and receives message frames from, other hub circuitry 406. The address detector circuit 403 maintains, or has access to, a list of the addresses of the nodes 204 that are connected to the port 201 associated with the gate keeper circuit 301 of which the address detector circuit 403 is a part. The address detector circuit determines whether the message frame is intended for one of the nodes 204 coupled to the associated port 201. In one embodiment of the present invention, the address list used by the address detector circuit 403 is supplied by the hub 200. In an alternative embodiment of the present invention, the address list is learned by the gate keeper circuit 301. In yet another embodiment of the present invention, the address detection circuit 403 learns the addresses of attached nodes upon initial installation of the address detection circuit 403. The address detection circuit 403 reports the initial list to a system administrator for review. Once the initial list is determined, changes can only be made under the direction of the system administrator. Which of these embodiments will be the preferred embodiment depends upon the security objectives for the network.

If the address detector circuit 403 determines that a message frame is not intended for, or sourced by, any of the nodes 204 connected to the port 201 associated with the gate keeper circuit 301, then the message frame is transmitted to the scrambler circuit 401a. In the preferred embodiment of the present invention, a determination is also made as to whether the message frame is of a type to be excluded from being scrambled. The frame is transmitted to the scrambler circuit 401a only if the frame is not to of the type to be excluded from scrambling. The scrambler circuit 401a of one embodiment of the present invention is coupled to the PRBS generator circuit 407, which generates a PRBS encoding word. The encoding word is transmitted to the scrambler circuit 401a which "Exclusive-ORs" (XORs) the data field of the message frame with the encoding word. The descrambler circuit 401b decodes messages by XORing the encoded message with the same PRBS encoding word used by the scrambler circuit 401a. This provides a fast and simple means to encode the data field of the message frame in such a manner that the data is unintelligible without knowledge of the encoding word. The PRBS encoding word may be changed periodically to enhance security. For example, the encoding word in a token ring can be changed each time the token is lost and the ring goes through an initialization sequence to generate a new token.

The EDC generator circuit 405b recalculates the EDC for the message frame after the encoding and replaces the previously calculated EDC with the newly calculated EDC. Therefore, each node 204 that receives a message frame in which the data field has been encoded can still detect errors that occur in the transmission of the message frame to the node 204. Furthermore, since only the data field is encoded (i.e., the trailer and header fields are not encoded), the protocol information necessary to perform diagnostic and statistical tracking, as well as the information necessary to move the frame around the ring network, are not effected by the encoding. In one embodiment of the present invention, when a message frame is found by the EDC checker circuit 405a to have an error, an indication is provided to the EDC generator circuit 405b. The EEDC generator circuit 405b ensures that the EDC code generated for the scrambled message indicates that an error exists. In a similar manner, when a scrambled message frame having an error is received by the EDC checker circuit 405c, an indication is provided to the EDC generator circuit 405d. The EDC generator circuit 405d modifies the generated EDC code for the scrambled message indicating that an error exists. Messages may be pipelined through the network. Therefore, the scrambler circuit 401a and the descrambler circuit 401b may be concurrently operating on different messages or the same message.

An example of the manner in which a message frame circulates around the network is provided to further aid in understanding the function of the gate keeper circuit 301 of the present invention. Referring to FIG. 3, assume that a node 204e is the intended destination of a message frame from source node 204g. The message is formatted in a frame having a header field containing the address of the destination node 204e and the source node 204g, a data field having the information to be conveyed to the destination node 204e, and a trailer section having the EDC and end symbol. When allowed by the media access protocol of the ring, the source node 204g transmits the message frame to the ring. The message frame is received by hub 200a at port 201d and conveyed to the gate keeper circuit 301d. The address detector circuit 403 determines that the source of the frame is on port 201d, so it is not modified by the descrambler 401b or EDC generator 405d. The frame is then transmitted by hub 200a to hub 200b, where it is encoded and decoded in the same way as the following description for gate keeper 301a and port 201a.

Upon receiving the start of the message frame from the hub 200b, the hub relays the message frame to the gate keeper circuit 301a. The message frame enters the gate keeper circuit 301a and is inspected by the address detector circuit 403 within the gate keeper circuit 301a (see FIG. 4). The address detector circuit 403 determines whether the message frame is intended for a node 204a, 204b, 204c, 204d of the subnetwork 206a connected to the port 201a. Since the message frame in this example is not intended for any of the nodes 204a–204d of the subnetwork 206a, the data field of the message frame is scrambled by scrambler circuit 401a. EDC circuit 405b generates a new EDC for the encoded message frame. The new EDC replaces the EDC that was formally held in the trailer field of the frame, thereby preventing the error correction and detection systems within each node from being affected by the encoding of the data section. As the message frame passes through the scrambler circuit 401a it is immediately transmitted out through the port 201a. Thus, very little delay in introduced.

From the port 201a, the message frame circulates around the ring network to the first node 204a of the subnetwork 206a. Because the data field of the message frame has been encoded, the data cannot be interpreted by the node 204a. However, the header field and trailer field have not been encoded and are read by the node 204a. The node 204a reads the address of the destination node 204e and determines that the message frame is not intended for the node 204a. The message frame is coupled from the node 204a back to the ring network, and circulates to each node 204b–204d on the subnetwork 206a. Each node 204b–204d in turn determines that the message frame is not intended for that node 204, and sends the message frame downstream to the next node on the network.

The message frame is returned from the node 204d through the port 201a to the gate keeper circuit 301a. The address detector circuit 403 within the gate keeper circuit 301 receives the message frame and again determines that the message frame was not sourced by, or not intended for, the nodes 204a–204d connected to the port 201a. Therefore, the address detector circuit 403 couples the message frame to the descrambler circuit 401b to be decoded. When the message frame has been decoded, the new EDC generated for the message frame replaces the EDC that was formally held in the trailer field of the message frame. The EEOC circuit 405d transmits the message frame to the other hub circuitry 406. The message frame is then transmitted to a second gate keeper circuit 301b, which is coupled to the next port 201b.

The message frame is transmitted to the address detector circuit 403 within the second gate keeper circuit 301b. The address detector circuit 403 determines that the message frame is intended for the node 204e which is on the subnetwork 206b coupled to the port 201b. Therefore, the message frame is not to be encoded, and the message frame is not modified by the scrambler 401a or EDC generator 405b as it is transmitted.

In one embodiment, after copying, the frame is transmitted by the destination node 204e with the message frame intact. The message frame continues around the network until it arrives at the source node, where it is removed from the network. Alternatively, the frame is removed from the ring network by the destination node 204e.

In the illustrated embodiment of the present invention, encoding consists of "Exclusive-Oring" (XOR'ing) the data field with a PRBS generated by a PRBS generator 407 within either the scrambler or descrambler circuit 401. The same PRBS encoding word is used to decode the data field. The PRBS is only known to the scrambler and descrambler circuits 401. Therefore, the message frame contents contained in the data field of the frame are unintelligible to the nodes 204 of ports 201 which do not have a node 204 for which the message frame is intended.

Figure 5A:
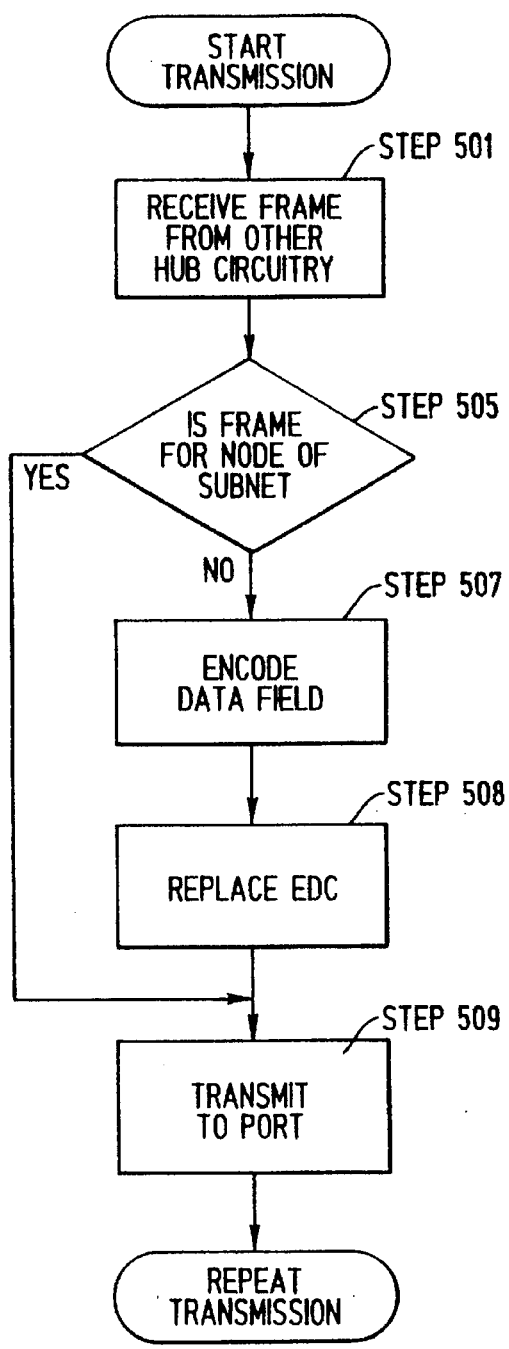
FIG. 5a is a flow chart of the steps of the inventive method for receiving a message frame in the gate keeper circuit from a hub within a ring network.

FIG. 5a is a flow chart of the steps of the inventive method for receiving a message frame in the gate keeper circuit 301b from a hub within a ring network. Initially, a message frame is received by a hub 200a within the network. The message frame is transmitted to the gate keeper circuit 301a associated with the first port 201a within the hub 200a (STEP 501). The gate keeper circuit 301a determines whether the message frame is intended for any of the adjacent nodes 204a–204d, within the subnetwork 206a that is coupled to the first port 201a (STEP 505). If the message frame is not intended for any of the nodes 204a–204d within the subnetwork 201a, the data field of the message frame is encoded by the gate keeper circuit 301a (STEP 507), and the EDC is replaced (STEP 508). Otherwise, the data field of the message frame is not encoded. The frame is then passed to port 201a (STEP 509) for transmission on subnetwork 206a.

Figure 5B:
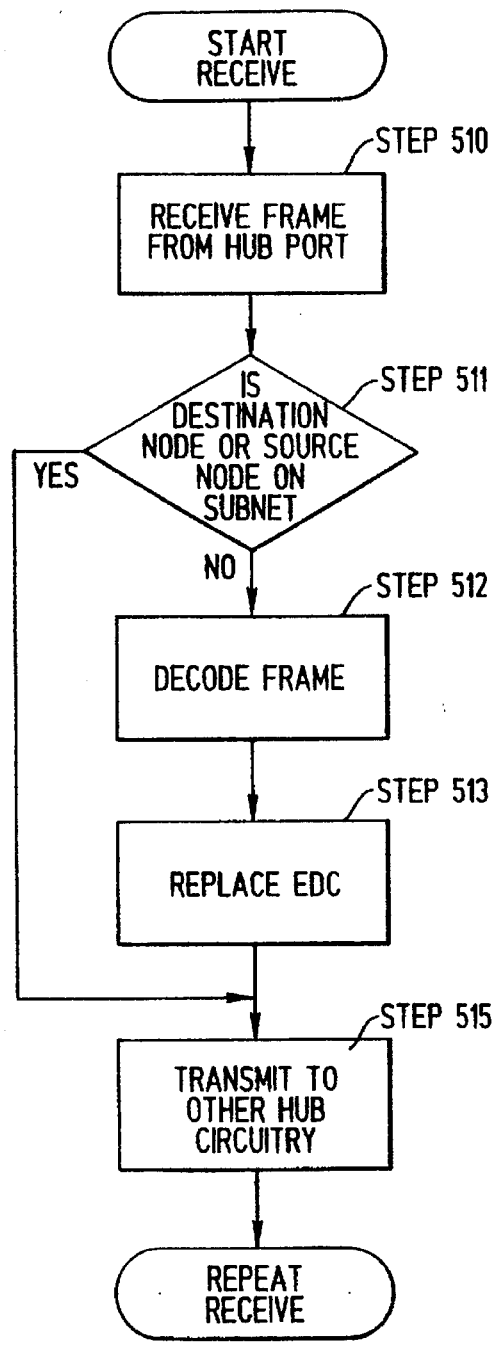
FIG. 5b is a flow chart of the steps of the inventive method for receiving a message frame in the gate keeper circuit from a node of a subnetwork within a ring network.

The message frame, whether encoded or not, circulates through each node 204a–204d of the subnetwork 201a until the message frame is either removed by a node, or it returns to the port 201a. FIG. 5b is a flow chart of the steps of the inventive method for receiving a message frame in the gate keeper circuit 301a from port 201a. The message frame is transmitted to the gate keeper circuit 301a (STEP 510) to again determine whether the message frame was intended for any node 204a–204d within the subnetwork 201a or sourced by a node on the subnetwork (STEP 511). If the frame was not intended for, or sourced by, any of the nodes 204a–204d within the subnetwork 206a, then the message frame is decoded (STEP 512) and the EDC is replaced (STEP 513). Otherwise, the message frame is not decoded. The message frame is then conveyed from the gate keeper circuit 301a to the other hub circuits 406 (STEP 515). The other hub circuitry then forwards the message frame to the next gate keeper circuit 301b, where the process is repeated.

Figure 6:
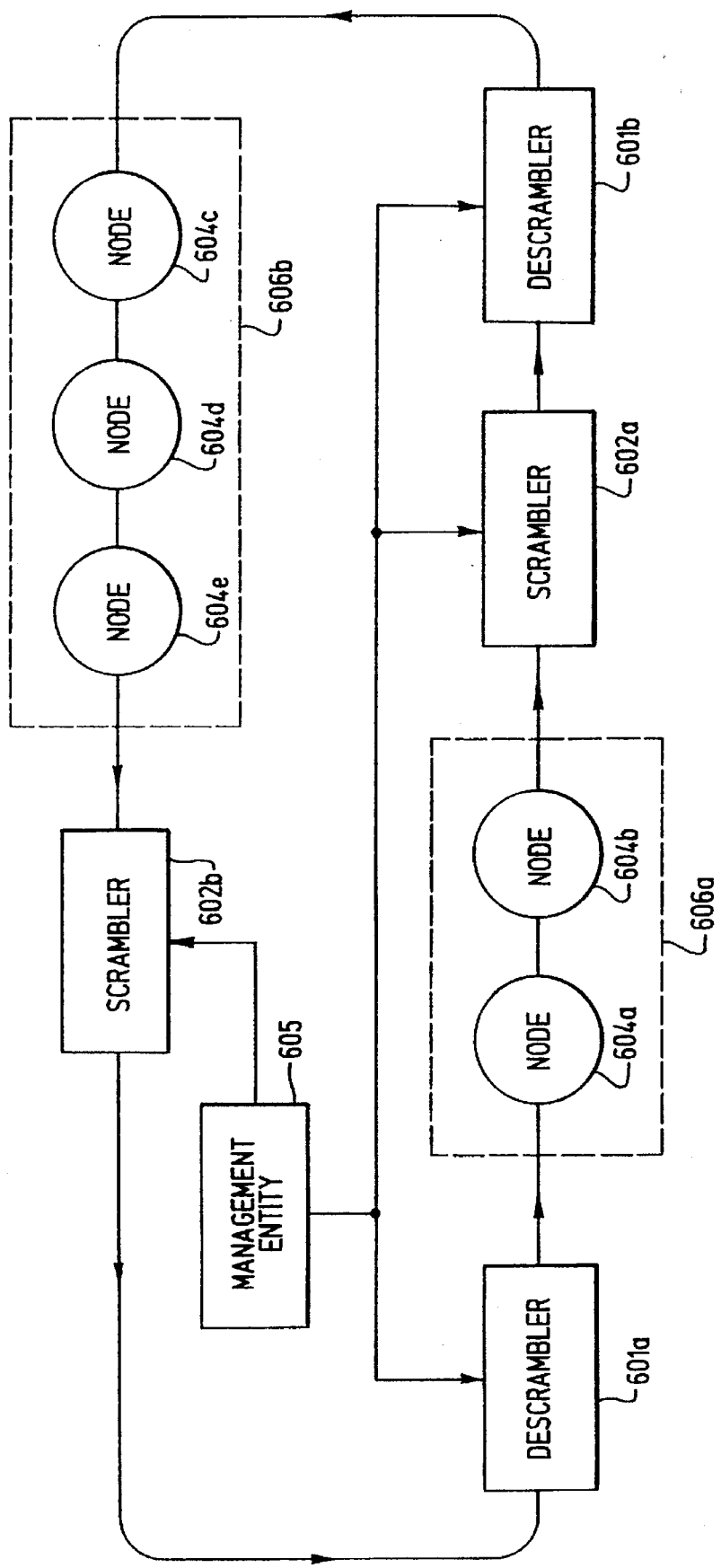
FIG. 6 is an illustration of the present invention as applied to a ring network in which hubs are not included.

FIG. 6 is an illustration of the present invention as applied to a ring network in which hubs are not included. In the application of the present invention illustrated in FIG. 6, a descrambler circuit 601 is coupled to the ring network. Any number of adjacent elements (such as adjacent nodes 604) comprising a first subnetwork 606a are serially connected to the ring network downstream from the descrambler circuit 601. A scrambler circuit 602 is coupled to the ring network downstream from the first subnetwork 606a of adjacent elements. This configuration of descrambler circuit 601, subnetwork 606, and scrambler circuit 602 may be repeated any number of times around the ring network. Each descrambler circuit 601 determines if message frames are intended for any of the nodes 604 included in the subnetwork 606 defined by these adjacent elements coupled between the descrambler circuit 601 and the scrambler circuit 602. If the message frames are intended for at least one of the nodes 604 included within the subnetwork 606, then the message frame is decoded. However, if the message frame is not intended for any of the nodes 604 within the subnetwork 606, then the message frame is not decoded and none of the nodes 604 within the subnetwork 606 can read the message frame. The scrambler circuit 602 determines whether the message frames that it receives are to be encoded or not, and encodes message frames that are not already encoded.

One means for determining whether the message frames are encoded is to determine where the message frame originated and to where the message frame is destined. If the message frame neither originated nor was destined for any of the nodes 604 in the subnetwork 606 from which it has just come, it is presently encoded and need not be encoded by the scrambler circuit 602. Otherwise, it is not presently encoded and the scrambler circuit must encode the message frame. The descrambler circuit 601 is as described with reference to one embodiment of the present invention, with the exception that a PRBS generator, as included within the gate keeper circuit 301 of FIG. 4, would not be feasible. Rather each scrambler and descrambler circuit 602, 601 would need to be in communication with a management entity 605. The management entity 605 would provide the code with which each scrambler and descrambler 602, 601 would encode and decode the message frame. In an alternative embodiment, the scrambler circuit 602, and the descrambler circuit 601 may be substituted one for the other such that the message frame is encoded upon leaving the subnetwork rather than upon entering the subnetwork, depending upon the security concerns relevant to the particular network.

Functional description of the preferred embodiment

Figure 7:
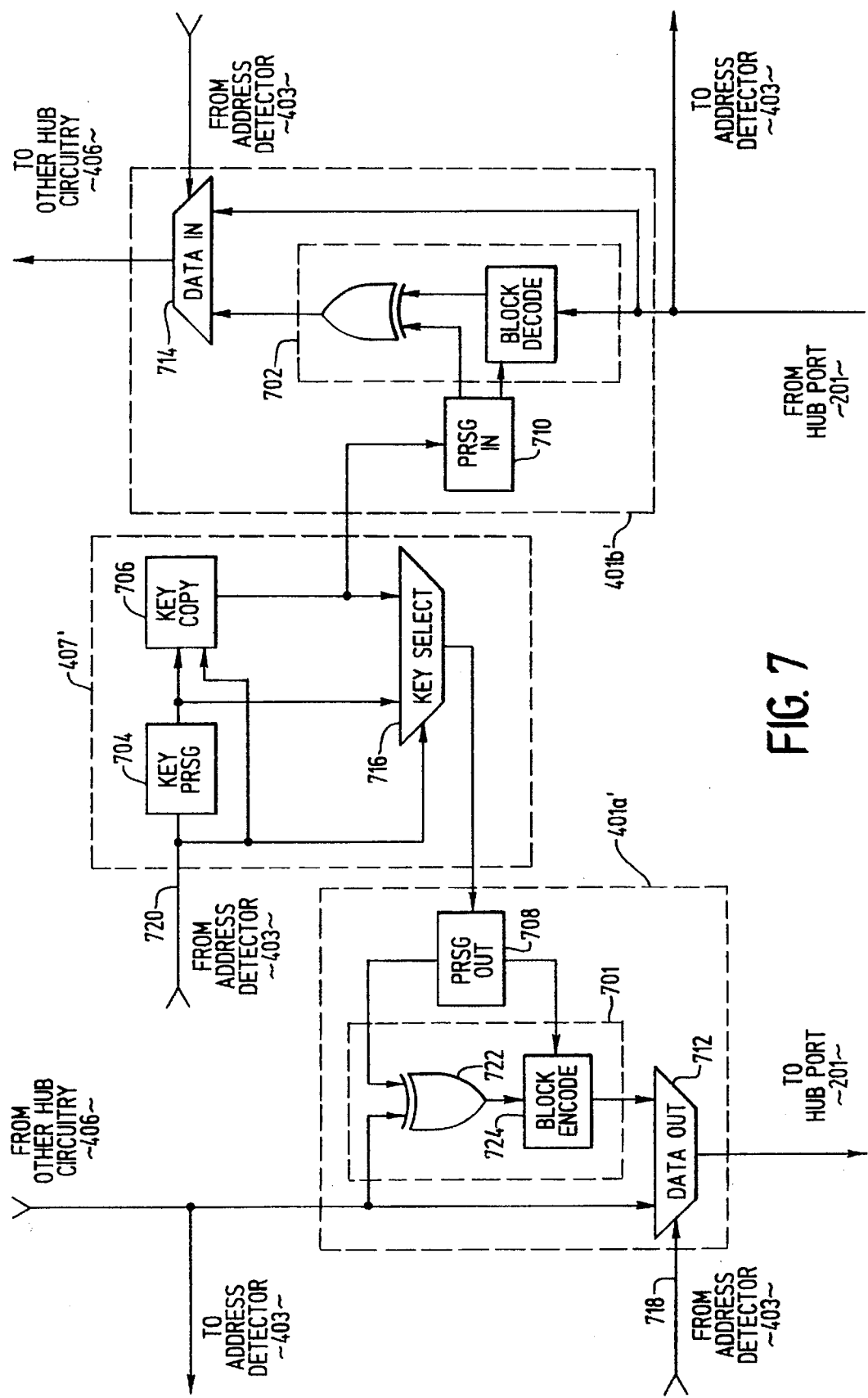
FIG. 7 is an illustration of a gate keeper circuit of the present invention in which a unique key is generated in association with each set of frames received between the occurrence of two trigger events.

FIG. 7 is a block diagram of a PRBS generator 407', a Scrambler 401a', and a descrambler 401b' in accordance with the preferred embodiment of the present invention. The scrambler 401a' includes an encoding circuit 701, a pseudo random sequence generator (PRSG) OUT 708, and a DATA OUT multiplexer 712. In accordance with the preferred embodiment of the present invention, the PRBS 407' includes a KEY PRSG 704, a KEY COPY register 706, and a KEY SELECT multiplexer 716. The descrambler 401b' includes a PRSG IN 710 (which is essentially the same as the PRSG OUT 708), a decoder circuit 702, and a DATA IN multiplexer 714.

When a message frame is received at the scrambler 401a' it is also received at the address detector 403. The address detector 403 determines whether the received frame is addressed to, or was sourced by, any of the nodes 204 within the subnetwork 206 coupled to the hub port 201. The address detector 403 also determines the type of frame received. If the address detector circuit 403 determines that a received frame is not intended for at least one of the nodes 204 within the subnetwork 206 connected to the associated hub port 201 and that the frame is of a type that is not excluded from scrambling, then the address detector circuit 403 sends a MUX CONTROL signal on a signal line 718 to switch the DATA OUT multiplexer 712 to couple the output of the encoding circuit 701 to the hub port 201. If the frame is intended for at least one of the nodes 204 within the associated subnetwork 206, then the MUX CONTROL signal causes the DATA OUT multiplexer 712 to couple the output of the other hub circuitry 406 to the hub port 201. Thus, only those frames that are not addressed to at least one node 204 within the subnetwork 206 associated with the address detector circuit 403 are scrambled.

Each PRSG 704, 708, 710 preferably generates a very long pseudo-random sequence (e.g., $2^{N-1}$, where N is the order of the polynomial). In the preferred embodiment of the present invention, N is 32 or larger. The sequence generated by the PRSG OUT 708 and the PRSG IN 710 is preferably based upon an identical Nth order polynomial and an initial value ("key") generated by the KEY PRSG 704 and possibly stored in the KEY COPY register 706. When the beginning of a frame is received at the scrambler 401a' or the descrambler 40b', the PRSG OUT 708 or the PRSG IN 710, respectively, preferably start to generate the sequence beginning at a starting point associated with the key. The PRSG 708, 710 then advances a fixed amount as each data byte within the frame is received. The PRSG 708, 710 preferably advances (8÷M) bits as each data byte in a frame is received within the scrambler 401a' or descrambler 401b', where M is preferably 3 or more. In the preferred embodiment of the present invention, 8 bits are coupled to an exclusive OR gate 722 and M bits are coupled to a block encoder 724.

The KEY PRSG 704 has two modes of operation. In the first mode of operation, the KEY PRSG 704 runs free (i.e., the output changes continuously at a rate that is preferably equal to the rate at which data is received). In the second mode of operation, the output of the KEY PRSG 704 remains constant. Such dual mode PRSGs are well known in the art. A DETECT signal output by the address detect circuit 403 on a detect signal line 720 is coupled to an input to the KEY PRSG 704 and determines the mode of the KEY PRSG 704. The DETECT signal output by the address detector circuit 403 on the detect signal line 720 is set when a token is detected entering the address detector circuit 403 from the other hub circuitry 406. The DETECT signal is reset when the address detector circuit 403 detects that the token has been received in the descrambler circuit 401b' from the hub port 201. Thus, the DETECT signal, in effect, indicates whether a token is currently circulating in the subnetwork 206.

Setting the DETECT signal causes the KEY PRSG 704 to enter the second mode of operation and cease changing its output value. The DETECT signal is also coupled to the KEY SELECT multiplexer 716. A first input to the KEY SELECT multiplexer 716 is coupled to the output of the KEY COPY register 706. A second input to the KEY SELECT multiplexer 716 is coupled to the KEY PRSG 704. When the DETECT signal is set, the multiplexer 716 couples the output of the KEY PRSG 704 to the input of the PRSG OUT 708. Resetting the DETECT signal causes the value of the KEY PRSG 704 to be loaded into the KEY COPY register 706, starts the KEY PRSG 704 free running again, and causes the KEY SELECT multiplexer 716 to couple the output from the KEY COPY register 706 to the input of the PRSG OUT 708. The PRSG IN 710 is preferably directly coupled to the KEY COPY register 706.

Operational description of the preferred embodiment

When no token is circulating through the subnetwork 206, the DETECT signal is reset. With the DETECT signal reset, the KEY PRSG 704 is free running and both the PRSG OUT 708 and the PRSG IN 710 are loaded with the value stored in the KEY COPY register 706 at the beginning of each frame received in succession by the address detector circuit 403.

In the preferred embodiment of the present invention, the first predetermined number of bytes of each frame remain unaltered. For example, in one embodiment of the present invention, the first 21 bytes of each frame remain unaltered. This allows a one-byte "FC" field, two six-byte "address" fields, and an eight-byte "snap header" to remain unaltered even in scrambled frames. The number of bytes which are left unscrambled will depend upon the particular protocol of the frames and the security requirements of the network.

After the first predetermined number of bytes of a current frame have passed through the gate keeper 301, the next byte of the current frame is scrambled by the encoder circuit 701 using the value output by the PRSG OUT 708. In the preferred embodiment of the present invention, the current byte to be scrambled is exclusive ORed (XORed) with selected bits from the PRSG OUT 708 by the XOR gate 722.

Another set of selected bits from the PRSG OUT 708 is applied to the block encoder 724. The block encoder 724 may be any type of encoder that uses a key to encode bytes of data which preferably alters the position of at least one bit of the data. The particular set of bits that are applied by the PRSG OUT 708 to the XOR gate 722 and to the block encoder 724 am preferably unique. However, in an alternative embodiment the bits applied to the XOR gate 722 may be identical in part or in total to the bits applied to the block encoder 724.

The PRSG OUT 708 preferably advances after each byte of the current frame is scrambled, thus generating a next subsequence of the sequence associated with the current frame. Accordingly, each data byte of the current frame is scrambled using one subsequence from among the sequence that begins with the value of the key loaded into the PRSG OUT 708 at the beginning of the each frame. The sequence can only be reconstructed by applying the same initial value to a substantially similar PRSG and advancing the PRSG the same amount as the PRSG OUT 708 has been advanced for each byte.

Since each frame has been encoded by the encoder circuit 701 using a sequence generated by the PRSG OUT 708 with the initial value being the value stored in the KEY COPY register 706, each such frame must be decoded when received in succession at the decoder circuit 702 by regenerating the sequence using the PRSG IN 710 starting at an initial value loaded from the KEY COPY register 706. Both the PRSG OUT 708 and the PRSG IN 710 use the value of from the KEY COPY register 706 until a token is detected by the address detector circuit 403, at which time the KEY PRSG 704 is frozen and the KEY SELECT multiplexer 716 couples the output of the KEY PRSG 704 to the input of the PRSG OUT 708. Since each frame that is received by the decoder circuit 702 before the token arrives at the decoder circuit 702 has been scrambled using the value from the KEY COPY register 706, that value continues to be used as the initial value by the PRSG IN 710 until the token is received at the decoder circuit 702 from the hub port 201. Once the address detector 403 detects that the token has been received from the hub port 201, the DETECT signal is reset. When the DETECT signal is reset, (1) the KEY COPY register 706 is loaded with the value of the value of the KEY PRSG 704, (2) the KEY PRSG 704 begins to free run, and (3) both the PRSG IN 708 and the PRSG OUT 710 are again initialized from the KEY COPY register 706 at the beginning of each frame.

Figure 8:
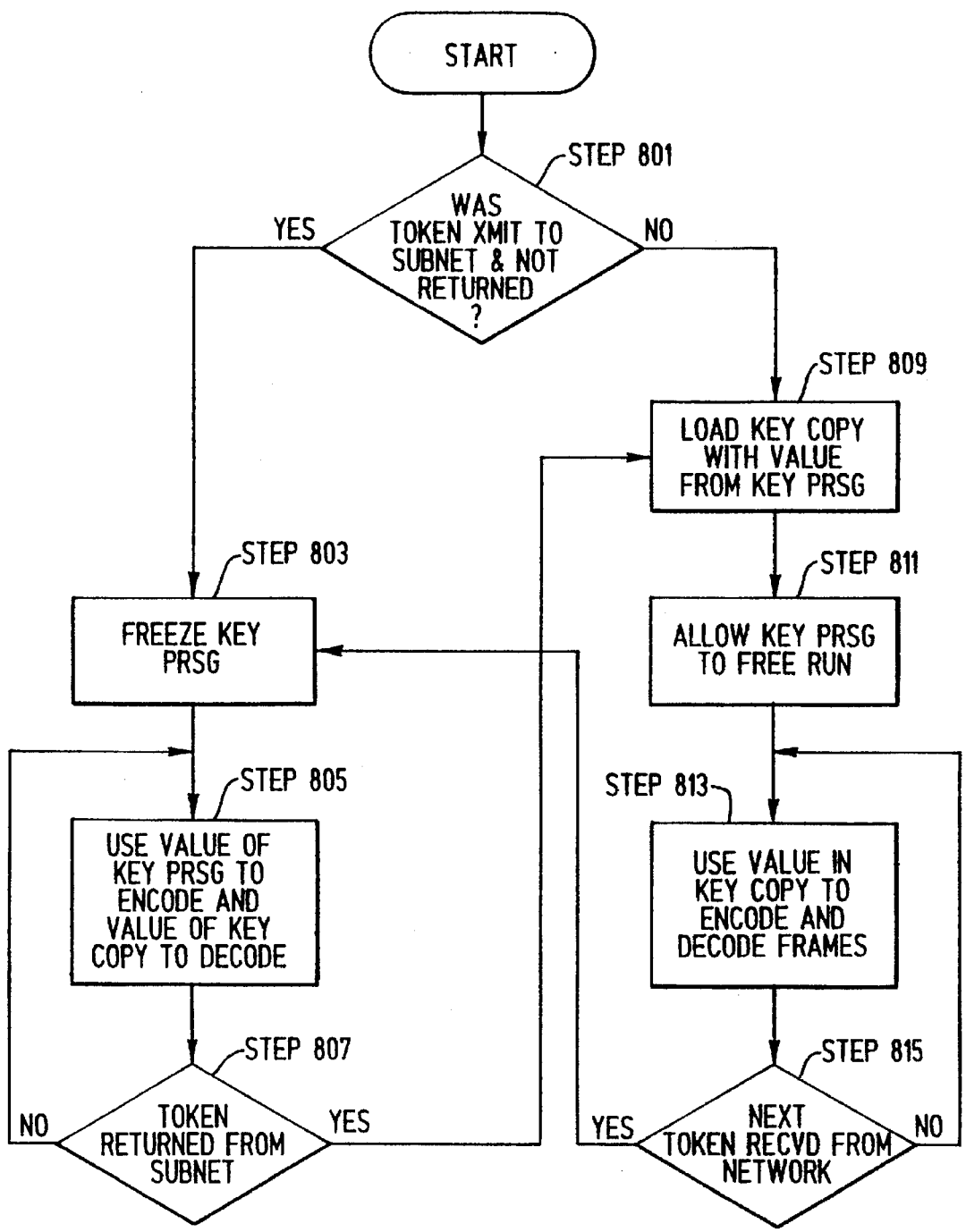
FIG. 8 is a flowchart illustrating the method for encoding and decoding frames as they enter and exit a gatekeeper in accordance with the preferred embodiment of the present invention.

FIG. 8 is a flowchart illustrating the method for encoding and decoding frames as they enter and exit a gatekeeper in accordance with the preferred embodiment of the present invention. In STEP 801, a determination is made as to whether a token was transmitted to a subnetwork 206 through the hub port 201 and has not yet arrived back at the hub port 201. In the preferred embodiment of the present invention, the DETECT signal from the address detector would be set in such a case. If a token was transmitted to the subnetwork and has not yet returned, then the DETECT signal is set, and the KEY PRSG 704 is frozen (STEP 803). The value of the KEY PRSG 704 is then used to encode each frame that is received from the other hub circuitry 406 and transmitted to the subnetwork 206. The value in the KEY COPY register 706 is used to decode each frame that is received in the hub port 201 from the subnetwork 206 (STEP 805). When the token returns to the hub port 201 (STEP 807), the KEY COPY register 706 is loaded with a value from the KEY PRSG 704 (STEP 809). The KEY PRSG is then released and free runs (STEP 811). The value of the KEY COPY register 706 is then used to encode each frame received from the other hub circuitry 406 and to decode each frame received from the subnetwork 206 (STEP 813). When the next token is received from the other hub circuitry 406, the procedure continues from STEEP 803. This procedure runs indefinitely.

Some PRSGs operate using algorithms that rely on the present value of the PRSG to generate the next value, and further rely on the fact that the present value is not equal to zero. Therefore, when such a PRSG is used, a means must be provided to either prevent the present value from becoming zero or to detect when the present value is zero and alter the value in such a case.

In an alternative embodiment of the present invention, keys may be provided from an external source. Furthermore, any one or more of a number of events that can be associated with a particular point in the stream of data that circulates on the subnetwork 206 can trigger a change in the key. For example, detection by the address detection circuit 403 of a special frame type, other than the token, or detection of a system state, such as a claim process, may serve as a trigger event. Accordingly, frames received from the other hub circuitry 406 after a first trigger event and before a corresponding trigger reset event are encoded using a key that is unique to those frames if they are not intended to be available to the nodes of the associated subnetwork 206. Likewise, frames received from the subnetwork 206 after a first trigger reset event and before a second trigger reset event are each decoded using the unique key that was used to encode the frames, if they were encoded.

Figure 9:
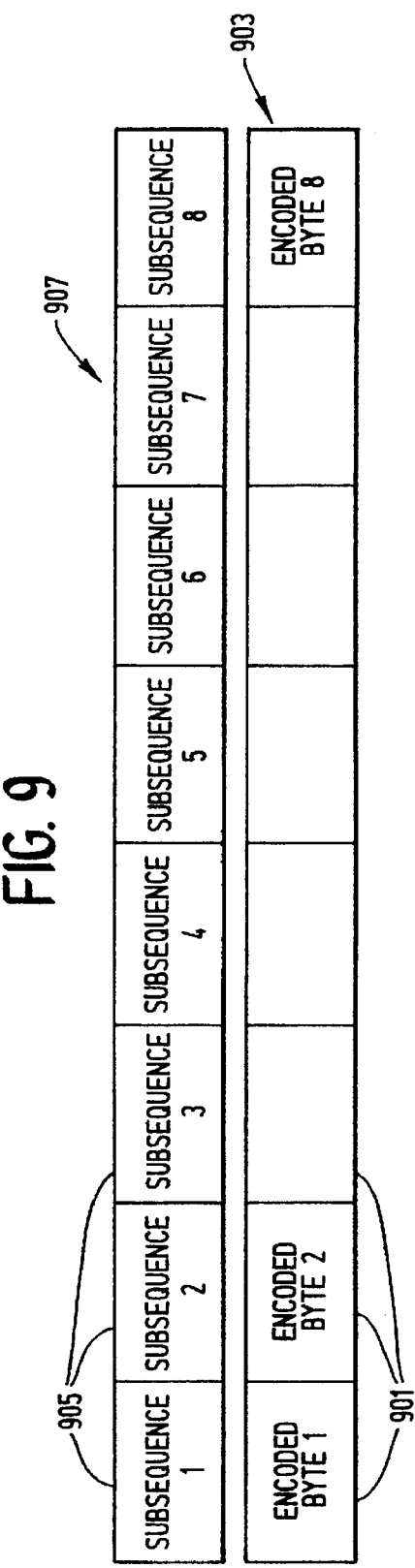
FIG. 9 illustrates the relationship of a sequence to a frame of data.

FIG. 9 illustrates the relationship of a sequence 907 to a frame of data 903. Each byte 901 of a frame 903 is associated with a subsequence 905 of a sequence 907 generated by either the PRSG OUT 708 or the PRSG IN 710, depending upon whether the frame 903 is exiting the gatekeeper 301 on route to the subnetwork 206 through the hub port 201 or entering the gatekeeper 301 from the hub port 201, respectively.

Figure 10:
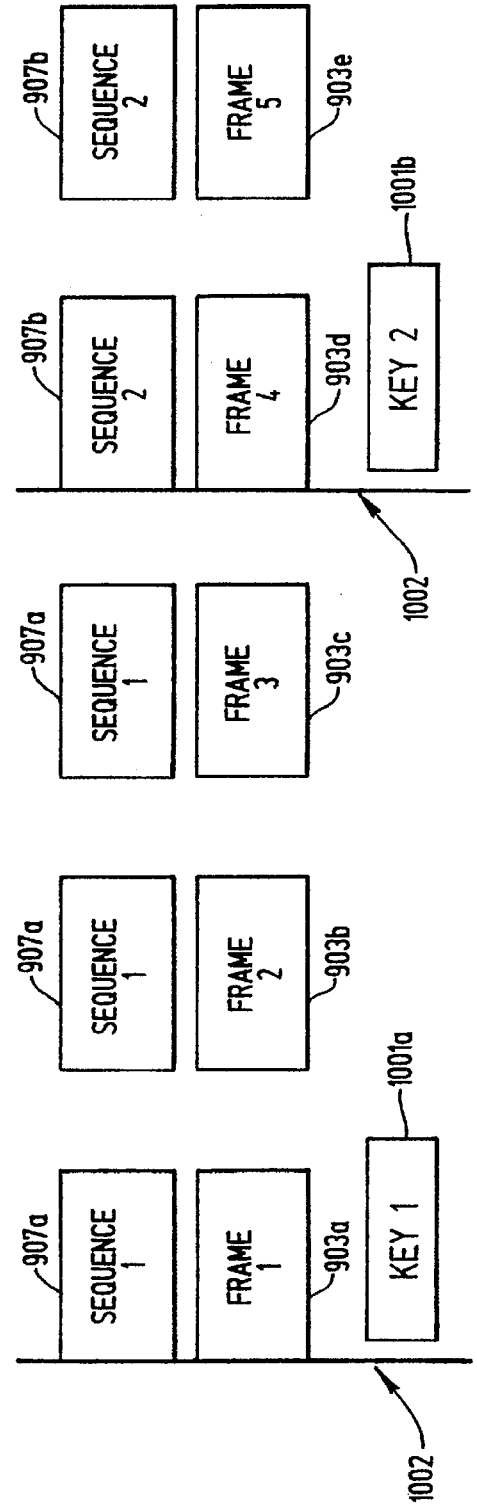
FIG. 10 illustrates the relationship between trigger events, keys, sequences and frames.

FIG. 10 illustrates the relationship between trigger events 1002, keys 1001, sequences 907, and frames 903. A distinct key 1001 is generated each time a trigger event 1002 occurs. The key 1001a is used to generate a plurality of sequences 907a, each such sequence 907a being generated upon receipt of a frame 903a, 903b, 903c. Sequences 907a generated using the same key 1001a are identical. Therefore, frames 903a, 903b, 903c received between trigger events 1002 are encoded using the same Sequence. Upon occurrence of a trigger event 1002, the value of the key 1001b changes, and the value of the Sequence 907b generated using the new key 1001b changes. The same sequence 907b is generated repeatedly each time a new frame 903d, 903e is received until a trigger event 1002 causes the sequence 907 to change again.

The more frequently the trigger events 1002 occur, the more secure the system, with the maximum security being had when each frame is associated with a unique (distinct) key 1001 which is unrelated to the previous and subsequent keys. However, if a second trigger event occurs before a trigger reset event occurs, then an alternative embodiment of the present invention is required, wherein the KEY COPY register must be capable of storing at least two keys. In such an embodiment, a means must be provided which ensures that the key used to generate the sequence that encodes a particular frame is used to generate the sequence that decodes that frame.

Preservation of errors

In the preferred embodiment of the present invention, the integrity of error detection codes is preserved by generating a new error detection code which is valid for the scrambled frame when the error detection code indicates valid data was received by the gate keeper 301, and by generating an invalid error detection code when the error detection code indicates that errors are present in the frame prior to scrambling. Thus, statistical information regarding the number and source of errors can be maintained even though frames are scrambled.

Figure 11:
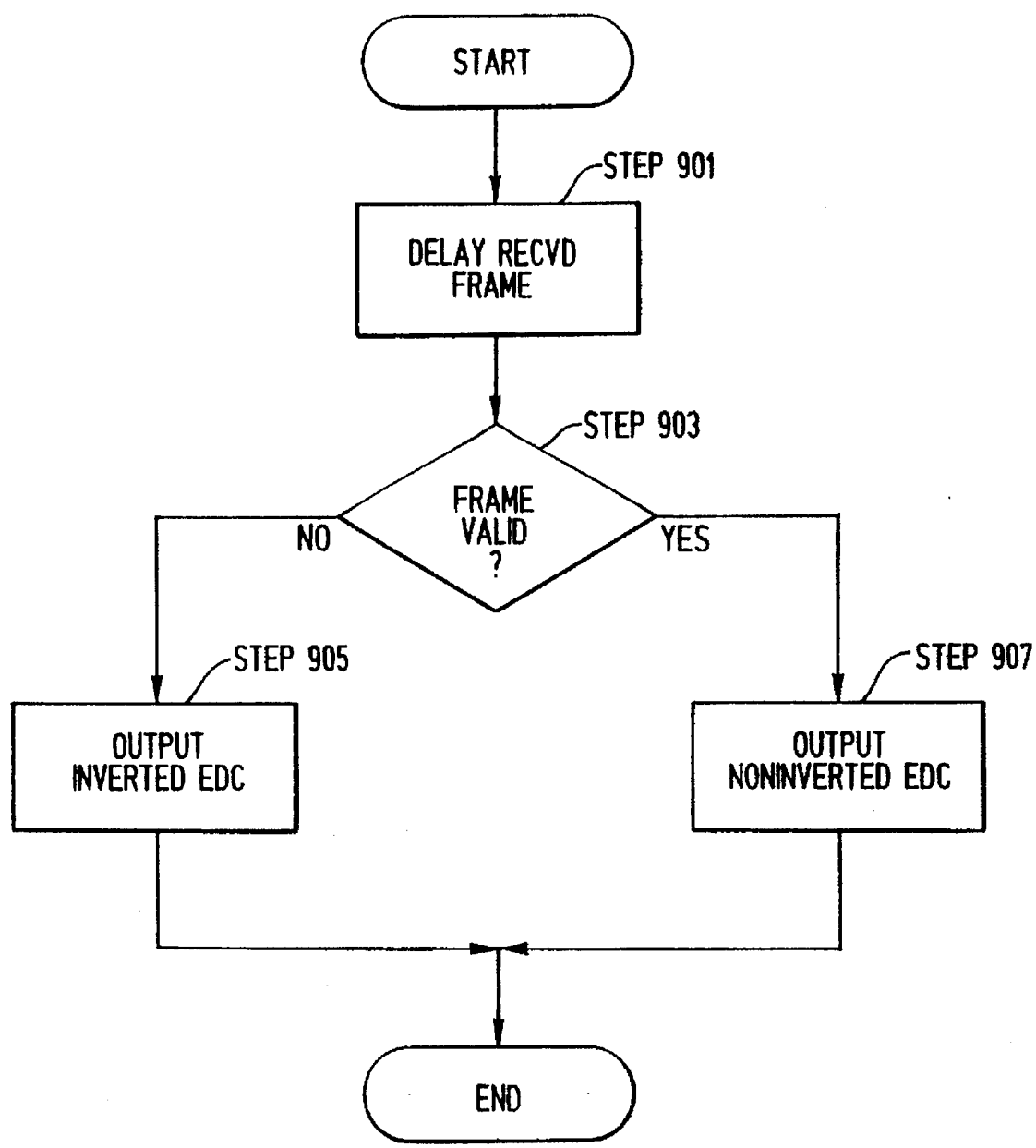
FIG. 11 is a flowchart of the method for preserving errors in accordance with the present invention.

In the preferred embodiment of the present invention, errors in the error detection code are preserved as described below and illustrated in the flowchart of FIG. 11. The error detection checker 405 delays each frame by an amount equal to at least a substantial portion of the length of the error detection code (STEP 901). For example, if the error detection code is 4 bytes long, then each byte of the frame is preferably delayed by the amount of time required for 4 bytes to be transferred. Delaying the frame allows the error detection code to be completely received and a determination made as to whether an error is present in the received frame before the newly generated error detection code is appended to the scrambled frame, replacing the original error detection code (STEP 903). If the received error detection code indicates that an error was present in the received frame before scrambling, then a substantial portion of the error detection code generated for the scrambled frame is inverted (STEP 905). Otherwise, the error detection code is output without the inversion (STEP 907).

Figure 12:
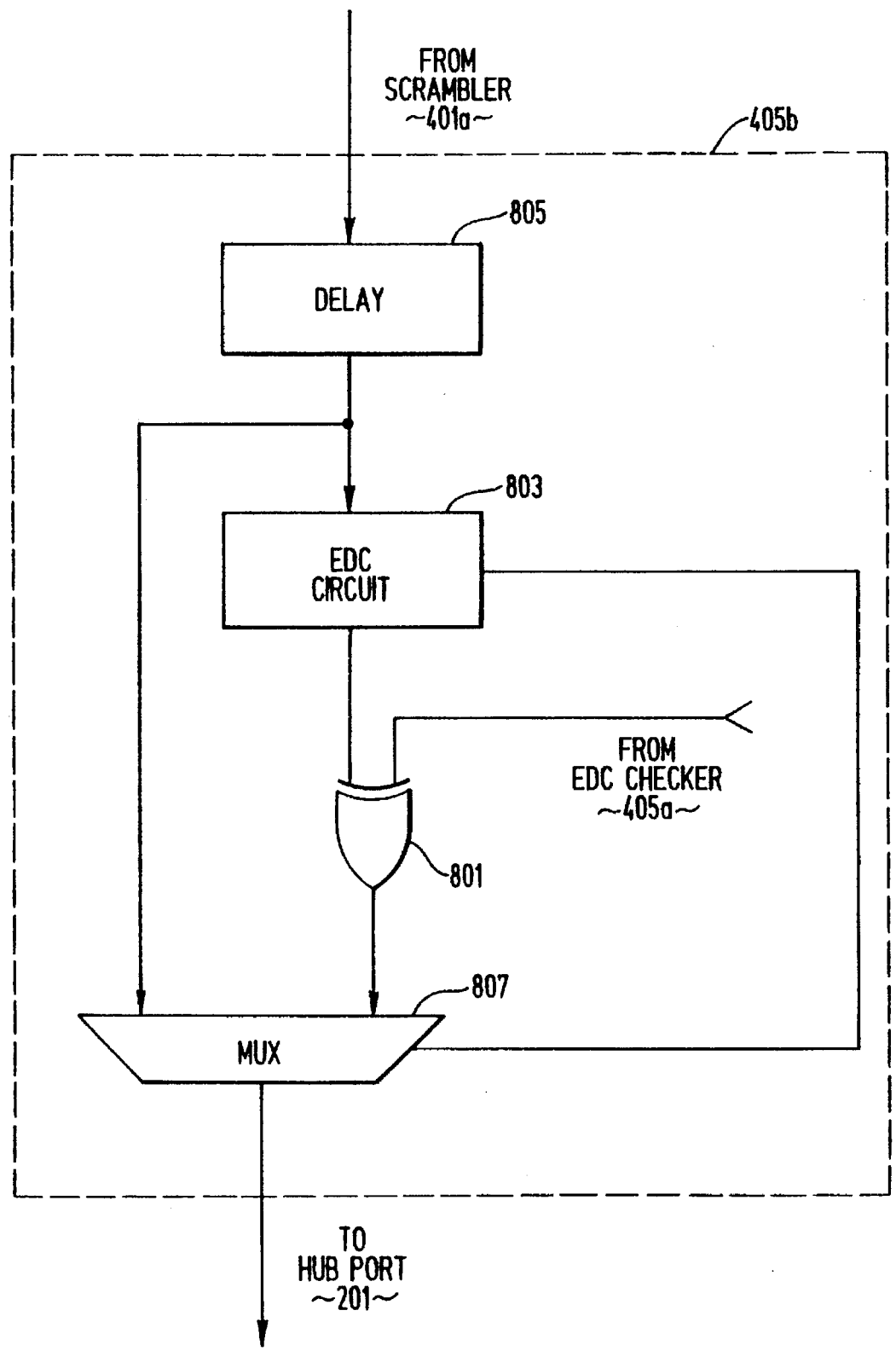
FIG. 12 is a block diagram of the EDC generator of the preferred embodiment of the present invention.

FIG. 12 is a block diagram of the EDC generator 405b of the preferred embodiment of the present invention. The inversion is performed using an XOR gate 801 having one input coupled to the output of the EDC circuit 803 from which the error detection code for the scrambled frame is to be output, and one input coupled to a VALID/NOT_VALID output from the EDC checker 405a. If the original error detection code is not valid, then the VALID/NOT_VALID output is set to an active logic level after each of the original error detection bytes have been received, causing a substantial portion of the output of the EDC circuit 803 to be inverted, that portion being equal to the length of the delay caused by a delay circuit 805 within the EDC generator 405b and coupled between the scrambler 401a and the EDC circuit 803. If the original error correction code is valid, then the VALID/NOT_VALID output remains in an inactive logic state, and the error detection code is not inverted. Inverting a substantial portion of the error detection code ensures that the error condition will be identified. A multiplexer 807 switches between the delayed scrambled bytes of the frame, and the newly generated error detection code output from the XOR gate 801 such that the error detection code is properly appended at the end of the data portion of the frame.

The obvious advantage of this scheme for scrambling data sent along a ring network is that nodes 204 can only read frames that are addressed to that node 204 or to at least one node located within the same subnetwork 206. Another advantage of this scheme is that frames sent by a node 204 which mimics another node 204 located on a different subnetwork 206 are scrambled upon entering the gate keeper 301, since the address detector circuit 403 determines that those frames should be unscrambled, thus effectively causing the scrambler circuit 401a to scramble those frames by attempting to unscramble those frames which were never initially scrambled.

The above description and example of the present invention should make clear that the present invention provides a fast, inexpensive, and easily implemented low-level security system on a ring network. The present invention selectively scrambles message frames based upon the origin, destination (i.e., either the destination as designated by the address, the destination based upon the fact that information is intended for all nodes, or the destination based upon the nature of the message), and type of the message frame, allowing the gate keeper circuits 3(:)1 to control the encoding and decoding function.

Furthermore, in accordance with the preferred embodiment of the present invention, each frame associated with a particular token is encoded with a unique value which is related to a key associated with the token. By changing the key upon detection of each token, the security of the network is enhanced, since it becomes much more difficult to determine the value used to encode a particular frame. However, decoding is relatively simple, since the same device that encodes each frame is responsible for decoding each frame, and therefore has the key readily available. In accordance with the present invention, the key never has to be transmitted outside the gatekeeper, making the value of each key very secure. However, in an alternative embodiment, the KEY PRSG 704 may be external.

A number of embodiments of the present invention have been described, Nevertheless, it will be understood that various modifications may be made without departing from the spirit and scope of the invention. For example, the present invention need not be synchronized to a byte clock, but rather may be synchronized to other bit groupings, such as nibbles, individual bits, multiple bytes, etc. Additionally, a subnetwork may include elements other than nodes as defined herein. Furthermore, when the key is changed, the polynomial used to generate the sequence within one or more of the PRSGs can be changed. It should be understood that changes made in the PRSG OUT 706 must also be made in the PRSG IN 710 at the appropriate time. Also, elements other than those discussed herein may be included in the ring network. Furthermore, the protocol of the ring may vary significantly from that described herein. For example, the ring network may be a token, slotted, or buffer insertion ring network, or linear topologies with similar characteristics. Messages may not be sent in frames, switches may be provided in the network which cause elements of the network to be bypassed in accordance with instructions included in the message frame, hubs may vary significantly from those described herein, etc. Also, while the description above describes a system in which an error detection code is part of the message frame, such an error detection code need not be part of the message frame. Accordingly, it is to be understood that the invention is not to be limited by the specific illustrated embodiment, but only by the scope of the appended claims.

We claim:

1. A network security system for use in a ring network having at least one node on a subnetwork, including:

(a) a scrambler circuit, coupled between the ring network and the subnetwork, for:

(1) receiving frames of data in succession from the ring network and determining if a current received frame is to be encoded;

(2) encoding at least part of each frame of a first set of frames received after a first trigger event and before a second trigger event using a first unique key associated with the first set of frames, and encoding at least part of each frame of a second set of frames received after the second trigger event and before a third trigger event using a second unique key associated with the second set of frames, if so determined; and (3) transmitting the current frame over the subnetwork to the at least one node; and (b) a descrambler circuit, coupled between the ring network and the subnetwork, for:
(1) receiving frames of data in succession from the at least one node;
(2) determining if the current received frame is to be decoded; and
(3) decoding the current received data using the associated key if so determined.

2. The network of claim 1, wherein:

(a) each frame of data includes at least one byte of data;

(b) the scrambler circuit includes a first pseudo random sequence generator circuit for:
(1) receiving a first unique key upon receipt of at least a portion of each frame of the first set and receiving a second unique key upon receipt of at least a portion of each frame of the second set; and
(2) generating a succession of sequences, the current sequence being generated using the current key each time a frame is received within the scrambler circuit, each sequence comprising a plurality of subsequences, each subsequence being associated with a unique byte of data within the current frame received within the scrambler circuit;

(c) the decoding circuit includes a second pseudo random sequence generator circuit for:
(1) receiving the first unique key upon receipt of at least a portion of each frame of the first set and receiving the second unique key upon receipt of at least a portion of each frame of the second set; and
(2) generating a succession of sequences, the current sequence being generated using the current key each time a frame is received within the descrambler circuit, each sequence comprising a plurality of subsequences, each sequence being associated with a unique byte of data within the current frame received within the descrambler circuit.

3. The network of claim 2, further including a pseudo random binary sequence generator, coupled to the scrambler circuit and the decoding circuit, for generating the keys.

4. The network of claim 3, wherein the pseudo random binary sequence generator includes:

(a) at least one key pseudo random sequence generator for generating the keys;

(b) at least one key copy register, coupled to the key pseudo random sequence generator, for storing at least one key; and (c) a multiplexer having at least two inputs, a first input being coupled to the output of the key pseudo random sequence generator and a second input being coupled to the output of the key copy register, for selectively coupling either the output of the key copy register or the output of the key pseudo random sequence generator to the scrambler circuit.

5. The network of claim 4, wherein:

(a) the key pseudo random sequence generator has a first mode of operation in which the output from the key pseudo random sequence generator free runs and the output of the key copy register is selected by the multiplexer to be coupled to the scrambler circuit, and a second mode of operation in which the output from the key pseudo random sequence generator is held constant and the output of the scrambler circuit;

(b) each trigger event is associated with a trigger reset event; and (c) the key pseudo random sequence generator operates in the first mode of operation before a first trigger event and after each trigger reset event, and in the second mode of operation after each trigger event.

6. The system of claim 5, wherein a trigger event occurs when a predefined data pattern is received in the scrambler circuit from the network and a trigger reset event occurs when the predefined data pattern is received in the descrambler circuit from the subnetwork.

7. The system of claim 6, wherein the predefined data pattern is a token.

8. The network of claim 2, wherein the scrambler circuit further includes:

(a) an encoding circuit, coupled to the first pseudo random sequence generator, for receiving in succession each subsequence generated by the first pseudo random sequence generator and using the current subsequence received in the encoding circuit to encode the associated byte of data; and (b) a decoder circuit, coupled to the second pseudo random sequence generator, for receiving in succession each subsequence generated by the second pseudo random sequence generator and using the current subsequence received in the decoder circuit to decode the associated byte of data.

9. A network security system for use in a ring network having at least one hub coupled thereto, at least one of the hubs having at least one active subnetwork connected thereto, the network security system including:

(a) scrambler circuit, coupled between one of the hubs having at least one active subnetwork and one of the active subnetworks, for receiving frames of data and determining if the received frames of data are to be encoded based upon the destination and source of each received frame of data, encoding at least part of a received frame of data using a unique key associated with each frame if so determined, and transmitting the frame of data over the active subnetwork;

(b) descrambler circuit, coupled between the one of the hubs having at least one active subnetwork and the one of the active subnetworks receiving frames of data, and for receiving frames of data from the active subnetwork, determining if a received frame of data is to be decoded based upon the destination and source of the received frame of data, and decoding the received frame of data using the unique associated key if so determined.

10. The network security system of claim 9, wherein the scrambler circuit further determines whether the frame is to be encoded based upon the type of frame.

11. The network security system of claim 9, wherein each scrambler circuit corresponds to a respective descrambler circuit.

12. The network security system of claim 11, further including:

(a) an address detection circuit, coupled to the scrambler circuit and to the descrambler circuit, for receiving data and determining the destination and source of the data;

(b) an error detection code generator circuit, coupled to the scrambler circuit, for generating an error detection code after encoding and decoding the data.

13. The network security system of claim 12, wherein the scrambler circuit further determines whether the frame is to be encoded based upon the type of frame.

14. The network security system of claim 12, wherein:

(a) the scrambler circuit encodes selected components of the data by Exclusive-ORing such components with at least a portion of the associated unique key; and (b) the descrambler circuit decodes the encoded components by Exclusive-ORing such components with the portion of the associated unique key.

15. The network security system of claim 14, further including a pseudo-random binary sequence generator circuit, coupled to the scrambler circuit and to the descrambler circuit, for generating each key.

16. The network security system of claim 15, wherein the key is a pseudo-random binary sequence.

17. A network security system for securing transmission of frames of data within a ring network having at least one hub having at least one port to which at least one node is coupled, and other circuitry, the ring network having at least two nodes, the network security system including:

(a) a gate keeper circuit associated with at least one active port of at least one hub, coupled between the associated port and the other circuitry of the associated hub, for determining if a current frame of data being transmitted to the associated port from the associated hub is intended for at least one of the nodes coupled to the associated port, and if the current frame of data is not intended for at least one of the nodes coupled to the associated port, then encoding at least part of the current frame of data using a unique key associated with a set of flames of data including the current frame of data, and otherwise not encoding any part of the transmitted frame of data, and for determining if a current frame of data being transmitted from the associated port to the associated hub was intended for, or originated within, at least one of the nodes coupled to the associated port, and if not then decoding the encoded part of the transmitted frame of data using the unique key associated with the set of frames in which the current frame is included, and otherwise not decoding the current frame of data.

18. The network security system of claim 17, wherein the gate keeper circuit further includes:

(a) an address detection circuit, coupled to the associated port and the other circuitry of the associated hub, for receiving each frame of data transmitted from the other circuitry of the associated hub to the associated port as a current output frame and determining the destination and source of the current output frame, and for receiving frames of data transmitted from the associated port to the other circuitry of the associated hub as a current input frame and determining the destination and the source of the current input frame received from the port;

(b) a scrambler circuit, coupled to the address detection circuit and to the other circuitry of the associated hub, for receiving frames of data from the other circuitry of the associated hub as current received frames and encoding at least part of a current received frame using a unique key associated with the current received frame if neither the source nor the destination of the current received frame, as indicated to the scrambler circuit by the address detection circuit, is at least one of the nodes coupled to the associated part;

(c) a descrambler circuit, coupled to the address detection circuit and to the associated port, for receiving each frame of data from the associated port as a current node frame and decoding part of the current node frame using the unique key associated with the current node frame if neither the source nor the destination of the current node frame is at least one of the nodes coupled to the associated port, as indicated to the decoder circuit by the address detection circuit, and otherwise not decoding the current node frame of data;

(d) an error detection code generator circuit, coupled to the scrambler circuit, the other circuitry of the associated hub, the associated port, and to the decoding circuit, for receiving frames of data from the scrambler circuit, generating an error detection code for each encoded frame of data received, transmitting the received frames of data and the generated error detection code to the associated port, and for receiving frames of data from the decoding circuit, generating an error detection code for each decoded frame of data, and transmitting each frame of data and the generated error detection code to the other port circuitry of the associated hub.

19. The network security system of claim 18, wherein the gate keeper circuit further includes:

(a) an error detection code checker circuit, coupled to the error detection code generator circuit, the other circuitry of the associated hub, and the associated port, for receiving frames of data from the other circuitry of the associated port, detecting errors in the received frames of data, and transmitting an indication of the error to the error detection code generator circuit and for receiving frames of data from the associated port, detecting errors in the received frames of data, and transmitting an indication of the error to the error detection code generator circuit;

and wherein the error detection code generator circuit generates an erroneous error detection code for a current frame of data received by the error detection circuit if the error detection code checker circuit transmits an indication to the error detection code generator circuit that an error was present in the current frame of data.

20. The network security system of claim 19, wherein:

(a) the scrambler circuit encodes selected components of each frame of data by Exclusive-ORing each frame of data with a key which is unique to each frame of data; and (b) the descrambler circuit decodes the encoded components by Exclusive-ORing each frame of data with the unique key associated with that frame of data.

21. The network security system of claim 20, wherein the unique key is a pseudo-random binary sequence.

22. A method for securing transmissions of data within a ring network having at least one hub coupled thereto, at least one of the hubs having at least one port, the at least one port being coupled to the ring network and having an active subnetwork connected to such port, including the steps of:

(a) receiving a frame of data within a hub;

(b) determining whether the received frame of data has a destination or source within the active subnetwork connected to a port of the hub;

(c) if the frame of data does not have a destination or source within such active subnetwork, then encoding at least part of the frame of data using a key which is unique to a set of frames of data including that frame of data, and otherwise, not encoding the frame of data;

(d) circulating the frame of data through the active subnetwork;

(e) receiving the circulated frame of data in the port;

(f) determining whether the circulated frame of data had a destination or source within the active subnetwork connected to the port;

(g) if the frame of data did not have a destination or source within such active subnetwork, then decoding a part of the frame of data using the unique key associated with the set of frames including that frame of data.

23. A method for encoding and decoding frames of data circulating on a ring network having at least one hub port coupled to a subnetwork and to a gatekeeper, the gatekeeper being coupled to a ring network and having scrambler, a descrambler, and a pseudo random binary sequence generator having a KEY pseudo random sequence generator capable of free running or being frozen and a KEY COPY register, including the steps (a) determining whether a predefined data pattern has been transmitted from the hub port to the subnetwork and has not returned;

(b) freezing the KEY pseudo random sequence generator if the predefined data pattern has been transmitted and not returned, otherwise continuing at step (e);

(c) using the value output by the KEY pseudo random sequence generator to encode frames of data to be transferred to the subnetwork and the value stored in the KEY COPY register to decode frames of data received from the subnetwork;

(d) determining whether the predefined data pattern has returned from the subnetwork;

(e) free running the KEY pseudo random sequence generator if the predefined data pattern has been returned to the gatekeeper from the subnetwork, otherwise continuing from step (c);

(f) storing a value output by the KEY pseudo random sequence generator in the KEY COPY register;

(g) using the value stored in the KEY COPY register to encode frames of data to be transmitted to the subnetwork, and to decode frames of data received from the subnetwork;

(h) repeating steps (b) through (g) upon receipt of a next predefined data pattern at the gatekeeper.

24. The method of claim 23, wherein the predefined data pattern is a token.

25. The method of claim 23, wherein the gatekeeper has a error detection code checker and an error detection code generator, further including the steps of:

(a) receiving frames of data in succession in a error detection code checker and checking the error detection code to determine whether there are errors in the current received frame;

(b) communicating the result of the determination to the error detection code generator;

(c) receiving the current frame within the error detection code generator a predefined time after the current frame is received within the error detection code checker;

(d) calculating a new error detection code for the current frame received within the error detection code generator;

(e) inverting the new error detection code if the result communicated from the error detection code checker indicates the presence of an error in the current frame, and otherwise not inverting the new error detection code.

* * * * *